United States Patent [19]

Shono

[11] Patent Number: 4,488,210

[45] Date of Patent: Dec. 11, 1984

[54] POWER SUPPLY CIRCUIT OF SWITCHING REGULATOR TYPE

[75] Inventor: Masahiro Shono, Osaka, Japan

[73] Assignee: Sanyo Electric Co., Ltd., Moriguchi, Japan

[21] Appl. No.: 482,979

[22] Filed: Apr. 7, 1983

[30] Foreign Application Priority Data

Apr. 7, 1982 [JP] Japan .................................. 57-58647
Apr. 19, 1982 [JP] Japan .................................. 57-65590

[51] Int. Cl.³ ........................................... H02M 3/335
[52] U.S. Cl. ...................................... 363/19; 363/97; 363/131
[58] Field of Search ........................... 363/18–21, 363/37, 56, 97, 98, 131; 331/112

[56] References Cited

U.S. PATENT DOCUMENTS 3,889,173  6/1975  Klusmann et al. ................... 363/19
4,208,705  6/1980  Hosoya .................................. 363/19
4,361,865  11/1982  Shono .................................. 363/19
4,378,585  3/1983  Betz .................................... 363/19

Primary Examiner—Peter S. Wong

Attorney, Agent, or Firm—Armstrong, Nikaido, Marmelstein & Kubovcik

[57] ABSTRACT

A power supply circuit of switching regulator type includes a converter transformer defined by a first winding for receiving input power from a DC source and second winding for producing output power. A switching transistor is connected to the first winding for alternately making and breaking electric connection between the DC source and the first winding by alternate turn on and off operations of the switching transistor, and a rectifier is connected to the second winding for rectifying the output power. A first detector is provided for detecting the rectified output DC voltage during off-period of the switching transistor and for producing an output-voltage signal representing the output DC voltage. A power supply circuit further includes a second detector for detecting the input DC voltage during on-period of the switching transistor and for producing an input-voltage signal representing the input DC voltage. The input-voltage signal and output-voltage signal are added to each other and the sum of these two signals are used for controlling the on and off operations of the switching transistor, so as to stabilize the rectified output power.

13 Claims, 14 Drawing Figures

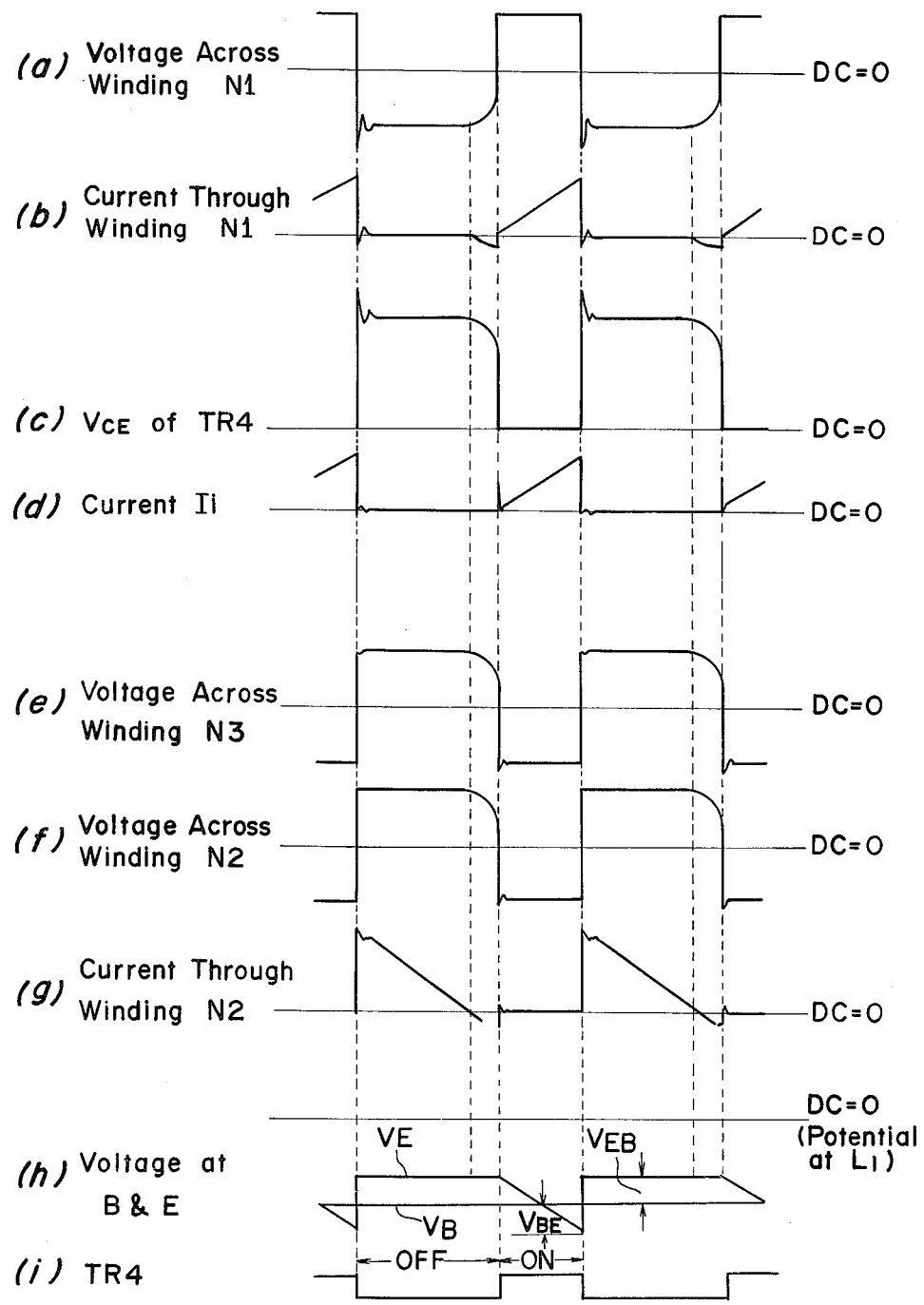

POWER SUPPLY CIRCUIT OF SWITCHING REGULATOR TYPE

BACKGROUND OF THE INVENTION

1. Field of the Invention

The present invention relates to a power supply circuit of switching regulator type and, more particularly, to an improvement thereof.

2. Description of the Prior Art

A power supply circuit of switching regulator type can be classified into a number of groups, and one of which includes a switching transistor and a converter transformer effecting a blocking oscillation. An example of such a power supply circuit is disclosed in U.S. Pat. No. 4,361,865 of the same applicant as the present application, and is described briefly hereinbelow with reference to FIG. 1.

The prior art power supply circuit of FIG. 1 comprises input rectifying portion 1, blocking oscillator portion 2, converter transformer 3, control circuit portion 5, and output rectifying portion 6. The input rectifying portion 1 receives an AC power from a commercial power line and produces a DC power across capacitor C2. The switching transistor TR4 carries out on-and-off operations repeatedly in a manner described later.

When the transistor TR4 is on, a voltage across the input winding N1 becomes high as shown by a waveform (a) in FIG. 2, and, at the same time, a current Ii flows from one side of the capacitor C2 through input winding N1, the collector-emitter transistor TR4, resistor R14, resistor R11, and junction A to the other side of the capacitor C2, as shown by a waveform (b) in FIG. 2. The resistor R14 is provided for emitter feedback, and the resistor R11 is provided for current detection. Since the current Ii gradually increases, a voltage drop across the resister R11 increases gradually. Thus, the voltage level at a junction A gradually decreases with respect to the voltage level at a line L1. The current Ii flowing through the winding N1 induces voltage across other windings, which are feedback winding NB, detecting winding NC and output winding N2. The voltage induced across the windings NB and N2 are shown by waveforms (c) and (d), respectively, and a current flowing through the winding N2 is shown by a waveform (e). It is to be noted that the voltage across the feedback winding NB has the same polarity as that across the winding N1, but the voltage across the winding N2 has the polarity opposite to that across the winding N1. During the transistor TR4 is on, an energy is stored in the winding N1. Furthermore, during the same period, the voltage produced across the winding NB allows a flow of positive feedback current If through base-emitter of the transistor TR4, resisters R14, positive feedback current control circuit SK (defined by resistors R12 and R13, diode D8 and capacitor C4) and back to the winding NB. Thus, switching transistor TR4 is maintained on.

Then, when the switching transistor TR4 is turned off in a manner described later, a current flows through the winding N2 to dissipate the energy, thereby producing a stable power from the output rectifying portion 6. Furthermore, during the transistor TR4 is turned off, the detecting winding NC produces a voltage which is relative to the voltage from the output rectifying portion 6, whereby during the transistor TR4 being off, the capacitor C3 holds a voltage which is proportional to the voltage produced from the output rectifying portion 6. When the voltage charged across the capacitor C3 is relatively high, i.e., when the power produced from the output rectifying portion 6 is above a standard level, base voltage of the transistor TR1 becomes high to increase the conductivity of the transistor TR1. Thus, a current discharged from the capacitor C3 and fed to the resistor R15 partly bleeds through the transistor TR1 and zenor diode D5 to the line L1, while the remaining current fed to the resister R15 flows through the resistors R7 and R8. When there is a bleeding current through the transistor TR1, the voltage level at the collector of the transistor TR1 becomes low, and, therefore, the voltage level at the junction between the resistors R7 and R8 becomes low. In other words, higher the voltage charged across the capacitor C3, greater the bleeding current and, thus, greater the voltage reduction at the junction between the resistors R7 and R8. At the junction B, voltage from the junction A through the capacitor C7 and resistor R16 is added with the voltage between the resistors R7 and R8. The capacitor C7 and resistor R16 are provided for cutting the DC component and for adjusting the voltage. Thus, the voltage at the junction B varies as shown by a waveform (f).

The on-and-off operation of the transistor TR4 is carried out in the following manner.

When the main switch SW turns on, a starting current Is flows through resistor R2 to the base of switching transistor TR4, whereby the switching transistor TR4 is turned on. During the switching transistor TR4 is turned on, the voltage at the junction A gradually decreases and, therefore, the voltage at a junction B gradually degreases. The junction B is connected to the base of transistor TR2. When the voltage, or potential, at the junction B falls below a predetermined level, the transistor TR2 becomes conductive thereby turning the transistor TR3 conductive. Thus a discharge current flows from capacitor C5 resistor R10, transistor TR3, resistor R14 and transistor TR4 to reverse bias the transistor TR4. Accordingly, the transistor TR4 is turned off. During the transistor TR4 is off, the output rectifying portion 6 produces output power, and at the same time, the capacitor C3 stores a voltage relative to the output power. Furthermore, during transistor TR4 is off, negative feedback current Ir flows from the winding NB through the diode D7 and capacitor C5 to charge the capacitor C5 in the polarity shown in FIG. 1, thus maintaining the transistor TR4 off. Then, by the resonance caused by the inductance of the input winding N1 and a distributed capacitance (a capacitor Cr shown in the drawings represents such a distributed capacitance), the switching transistor TR4 is biased forwardly, thereby turning the transistor TR4 on again.

From the start of current flow through the transistor TR4 in this cycle, the voltage level at the junction A gradually decreases and thus, the voltage level at the junction B gradually decreases. The voltage at the junction B decrease from a level determined by the voltage charged across the capacitor C3. When the voltage charged across the capacitor C3 is high, the voltage at the junction B decreases from a relatively low level and when the voltage charged across the capacitor C3 is low, the voltage at the junction B decreases from a relatively high level. Then, when the voltage at the junction B decreases to the predetermined level, the transistor TR2 conducts to turn the switching transistor TR4 off. Thus, a period in which the switching transistor TR4 is on is determined by the voltage level charged in the capacitor C3. During the transistor TR4 is on, energy is accumulated in the transformer 3, and when it is off, the accumulated energy is dissipated by the current flow from the output rectifying portion 6.

By controlling the duration of on-period T1 (FIG. 2, row (g)) of the switching transistor TR4, the power produced from the output rectifying portion 6 can be maintained constant regardless of unwanted fluctuation in the input AC power and of fluctuation in the load.

The prior art power supply circuit has following disadvantages.

Fist of all, the prior art power supply circuit has a poor stability of the output current. In the above described power supply circuit, a current flowing through a load (not shown) connected to the output rectifying portion 6 increases in a following manner.

Since the power consumed in the load is proportional to the energy accumulated in the winding N1 by the current Ii during the on-period T1 of the switching transistor TR4, the increase of load current results in increase of peak value Icp of the current Ii. More specifically, when the load current increases, the DC voltage between the lines L1 and L2 becomes low and, therefore, the voltage level (level lo in FIG. 2 waveform (f)) at the junction B becomes high. Thus, the moment when the transistor TR2 is turned on is delayed, thereby prolonging the duration of on-period T1 of the switching transistor TR4. Since the current Ii increases incessantly during the on-period T1 of the transistor TR4, the peak value Icp of the current Ii becomes high. Therefore, according to the prior art power supply circuit shown in FIG. 1, the maximum available load current which can be produced from the output rectifying portion 6 is accomplished when the transistor TR1 is held off to provide a maximum available voltage to the junction B, thereby maintaining the switching transistor TR4 on for the maximum available period.

According to the prior art power supply circuit, the peak value Icp of the current Ii is dependent not only to the on-period T1 as described above, but also it is dependent on input voltage Vi across the capacitor C2, as indicated below:

$$Icp = Vi \times T1/L1$$

wherein L1 is an inductance of the input winding N1. From the equation, it is understood that the peak Icp of the input current Ii becomes high as the input voltage Vi becomes high. In other word, the maximum available output current varies with respect to the change of the input voltage Vi, as shown by output current to output voltage characteristic curve in FIG. 4a, wherein a solid line represents a case where the input voltage Vi is at the standard level, dotted line represents a case where the input voltage Vi is below the standard level, and a dot-dash line represents a case where the input voltage Vi is above the standard level. In the case where the input voltage Vi is below the standard level, the maximum available current is below the standard level and, where the input voltage Vi is above the standard level, the maximum available current is above the standard level.

Thus, the prior art power supply circuit has a poor stability in output current. Therefore, the prior art power supply circuit is not suitable for use, for example, in a television receiver, because in the television receiver, since a current flowing through the CRT (cathode ray tube) varies greatly with respect to the change of brightness of the picture on the CRT, a total required current flowing through the television receiver also changes greatly. From this view point, it is necessary to enable the power supply circuit to supply a current sufficient to cope with the maximum current required by the television receiver even when the maximum available current from the power supply circuit is low due to the low input voltage Vi. This means that, it is necessary to design the power supply circuit or each circuit in the television receiver in such a manner as to render the maximum available current greater than the maximum required current even when the input voltage Vi is comparatively low, resulting in complicated structure and less freedom on design.

The second disadvantage is in the transistor TR2. During the off-period of the switching transistor TR4, the transistor TR4 is reverse biased by the voltage generated across the feedback winding NB and, at this moment, the capacitor C5 is charged with a voltage which is slightly lower than the voltage from the feedback winding NB. Therefore, the voltage level at the junction D, which is identical to the emitter of the transistor TR2, is almost the same as the voltage level at the line L1. Since no negative voltage, under this condition, will be supplied from the junction A to the junction B, the voltage level at the junction B is made sufficiently high with respect to the voltage level at the line L1. Therefore, the transistor TR2 is reverse biased between its base and emitter with a high voltage. Thus, the prior art power supply circuit requires a transistor TR2 having a high dielectric strength with respect to the voltage applied reversely between the base and emitter thereof.

The third disadvantage is in the arrangement of converter transformer 3. According to the prior art power supply circuit, the feedback winding NB and the detecting winding NC are provided separately; and a circuit (carrying current Ir) for charging the capacitor C5 is electrically floating with respect to the line L1. Therefore, it is necessary to provide a high electric insulation between the windings NB and NC, resulting in bulky size and complicated structure of the converter transformer 3. Moreover, its manufacturing cost increases.

The fourth disadvantage is in the arrangement for providing a biasing voltage to the transistor TR2. According to the prior art power supply circuit, the transistor TR2 is provided with biasing voltage from the junction A through resistor R16 and capacitor C7, in addition to the voltage from the junction between the resistors R7 and R8. Since the capacitor C7 is necessary for cutting the DC component, and the resistor R16 is necessary for regulating the voltage, the circuit elements C7 and R16 can not be eliminated.

The fifth disadvantage is in the arrangement of the positive feedback current control circuit SK. According to the prior art power supply circuit mentioned above, the positive feedback current If flowing through the circuit SK varies relatively to the change of input voltage Vi, causing following drawbacks. As described above, the positive feedback current If flows through the circuit SK, and mostly through the resistor R13 and diode D8, because the impedance of the capacitor C4 and resistor R12 is very high when compared with that of the resistor R13. In this case, since the impedance of the resistor R13 and diode D8 can be considered as constant, the positive feedback current If can be considered as being proportional to the voltage developed across the winding NB during the on-period of the switching transistor TR4, and thus, it is proportional to the voltage Vi provided across the input winding N1. Therefore, the positive feedback current If becomes great as the input voltage Vi becomes high, and vice versa.

In the case where the input voltage Vi is high, the on-period of the switching transistor TR4 becomes short and, therefore, the peak value Icp of the current Ii becomes rather low. Therefore, in spite of low level of the current Ii, a large amount of positive feedback current If flows through the base of the transistor TR4. Thus, the switching transistor TR4 operates beyond the rated range, resulting in over-drive operation.

On the other hand, when the input voltage Vi is rather low, the on-period of the switching transistor TR4 becomes long and, therefore, the peak value Icp of the current Ii becomes rather high. Therefore, in spite of high level of the current Ii, the positive feedback current If is small. In this case, the switching transistor TR4 is driven in a so-called under-drive condition.

Thus, in the case when the input voltage fluctuates to a relatively low or high level, the collector loss of the transistor TR4 becomes great and, thus, the range in which the power supply circuit operates stable becomes narrow.

Furthermore, although the turn-off operation of the switching transistor TR4 is carried out by the reverse bias current Id flowing from the charged capacitor C3, the current Id remains constant regardless of fluctuation in the input voltage Vi. This is because the capacitor C3 is charged during off-period of the transistor TR4 by the voltage generated across the winding NB, and such a voltage is controlled to be constant under the stable operating condition. In the case where the input voltage is relatively high, however, the switching transistor TR4 is in the over-drive condition and, thus, the reverse bias current Id may fail to turn-off the switching transistor TR4, because of lack of current level in the reverse bias current Id. From this view point also, the stable operating range of the power supply circuit becomes narrow.

In addition to the above, since the capacitor C5 is not charged when the main switch SW is turned on, the collector current Ii of the transistor TR4 reaches as high as β times the positive feedback current If. Therefore, in the case where the input voltage Vi is high, the positive feedback current If becomes high. Thus, the collector current Ii increases above the rated range, or safety range, thereby causing damage to the transistor TR4.

Furthermore, in the case of over-loading, the increase of load current affects on the secondary winding N2 to reduce the output voltage. On the other hand, however, the collector current Ii of the transistor TR4 increases so as to prevent such a voltage drop down in the secondary winding N2. In this case, if the input voltage is rather high, it is possible to supply a large amount of positive feedback current If to the transistor TR4. If this happens, the collector current Ii also increases, causing damage to the transistor TR4.

SUMMARY OF THE INVENTION

The present invention has been developed with a view to substantially solving the above described disadvantages and has for its essential object to provide an improved power supply circuit of switching regulator type which operates under a stable condition.

It is also an essential object of the present invention to provide an improved power supply circuit of switching regulator type wherein the maximum available output current is constant regardless of fluctuation in the input voltage.

It is a further object of the present invention to provide an improved power supply circuit of switching regulator type wherein the transistor TR2 for controlling the turn-off of the switching transistor TR4 can be operated without receiving a high reverse voltage between base and emitter thereof and, therefore, the transistor TR2 can be of a low dielectric strength type.

It is another object of the present invention to provide an improved power supply circuit of switching regulator type wherein the converter transformer 3 can be arranged in a compact size.

It is yet another object of the present invention to provide an improved power supply circuit of switching regulator type wherein the capacitor C7 and resistor R16 can be eliminated.

It is a still further object of the present invention to provide an improved power supply circuit of switching regulator type wherein the positive feedback current If can be maintained constant regardless of undesirable change in the input voltage Vi.

In accomplishing these and other objects, a power supply circuit of switching regulator type according to the present invention comprises a converter transformer defined by a first winding for receiving input power from a DC source and second winding for producing output power. A switching transistor is connected to the first winding for alternately making and breaking electric connection between the DC source and the first winding by alternate turn on and off operations of the switching transistor, and a rectifier is connected to the second winding for rectifying the output power. A first detector is provided for detecting the rectified output DC voltage during off-period of the switching transistor and for producing an output-voltage signal representing the output DC voltage. A power supply circuit further comprises a second detector for detecting the input DC voltage during on-period of the switching transistor and for producing an input-voltage signal representing the input DC voltage. The input-voltage signal and output-voltage signal are added to each other and the sum of these two signals are used for controlling the on and off operations of the switching transistor, so as to stabilize the rectified output power.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

Figure 3:
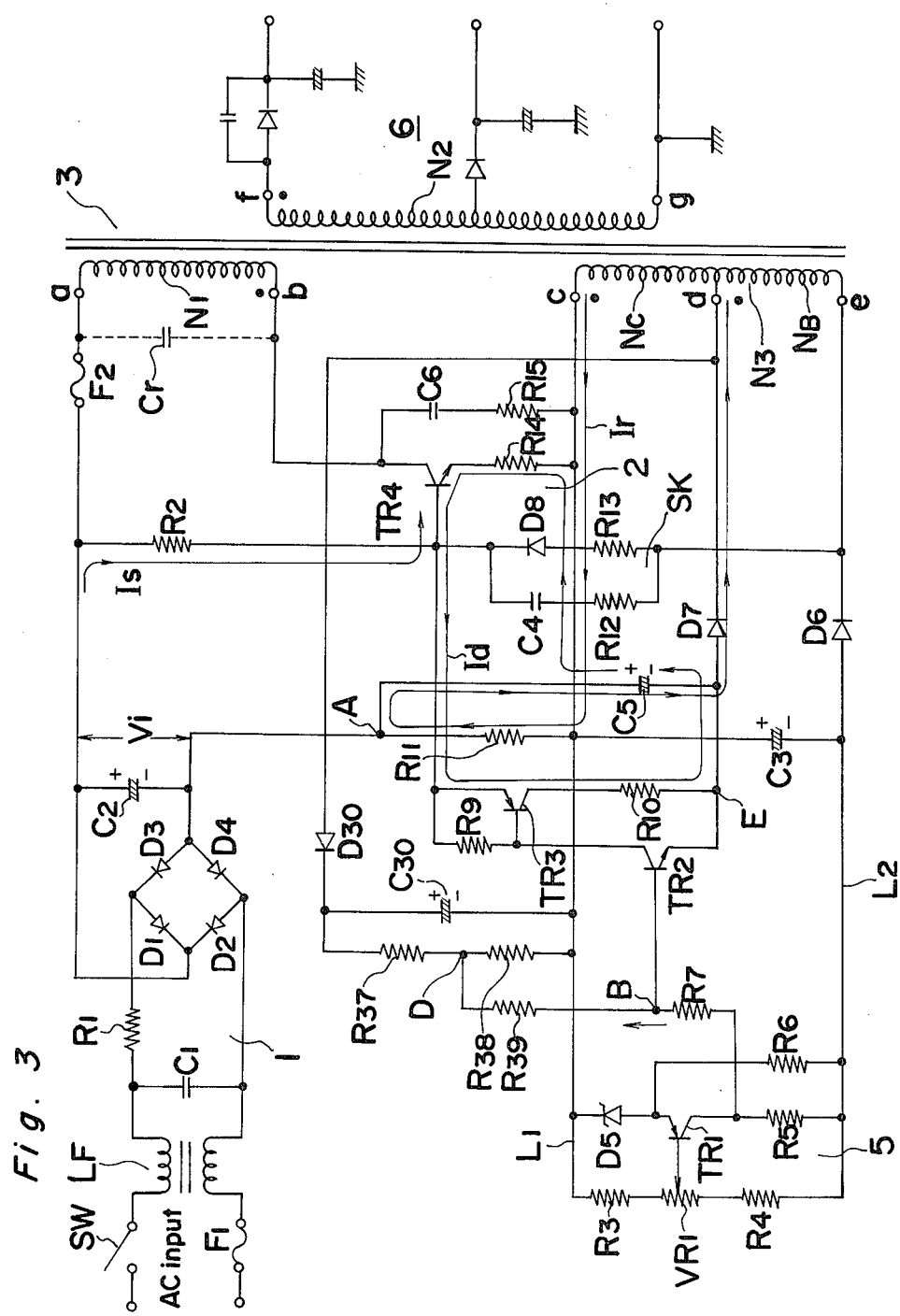
FIG. 3 is a circuit diagram of a power supply circuit of switching regulator type according to the first embodiment of the present invention.
Figure 6:
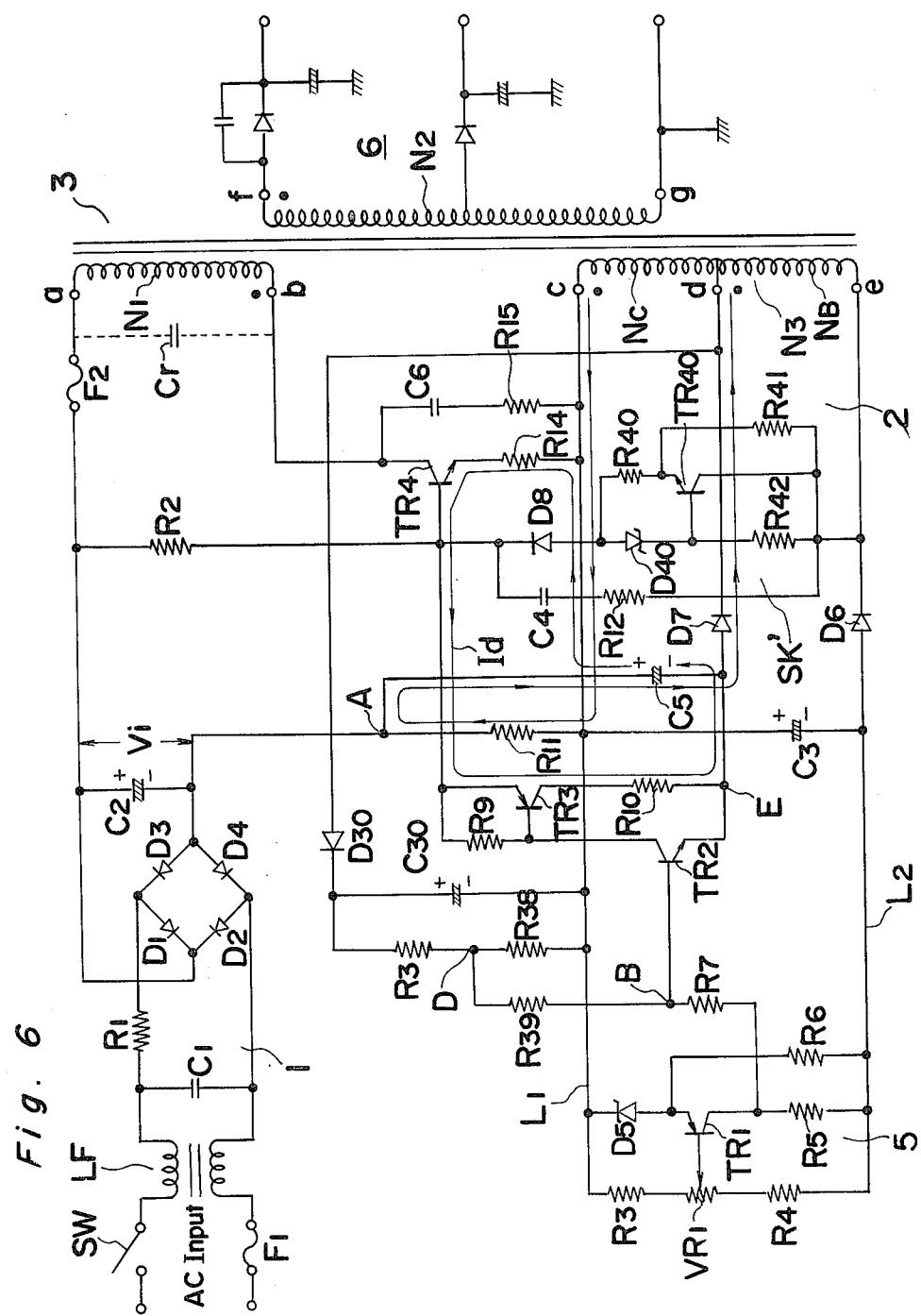
Figure 7:
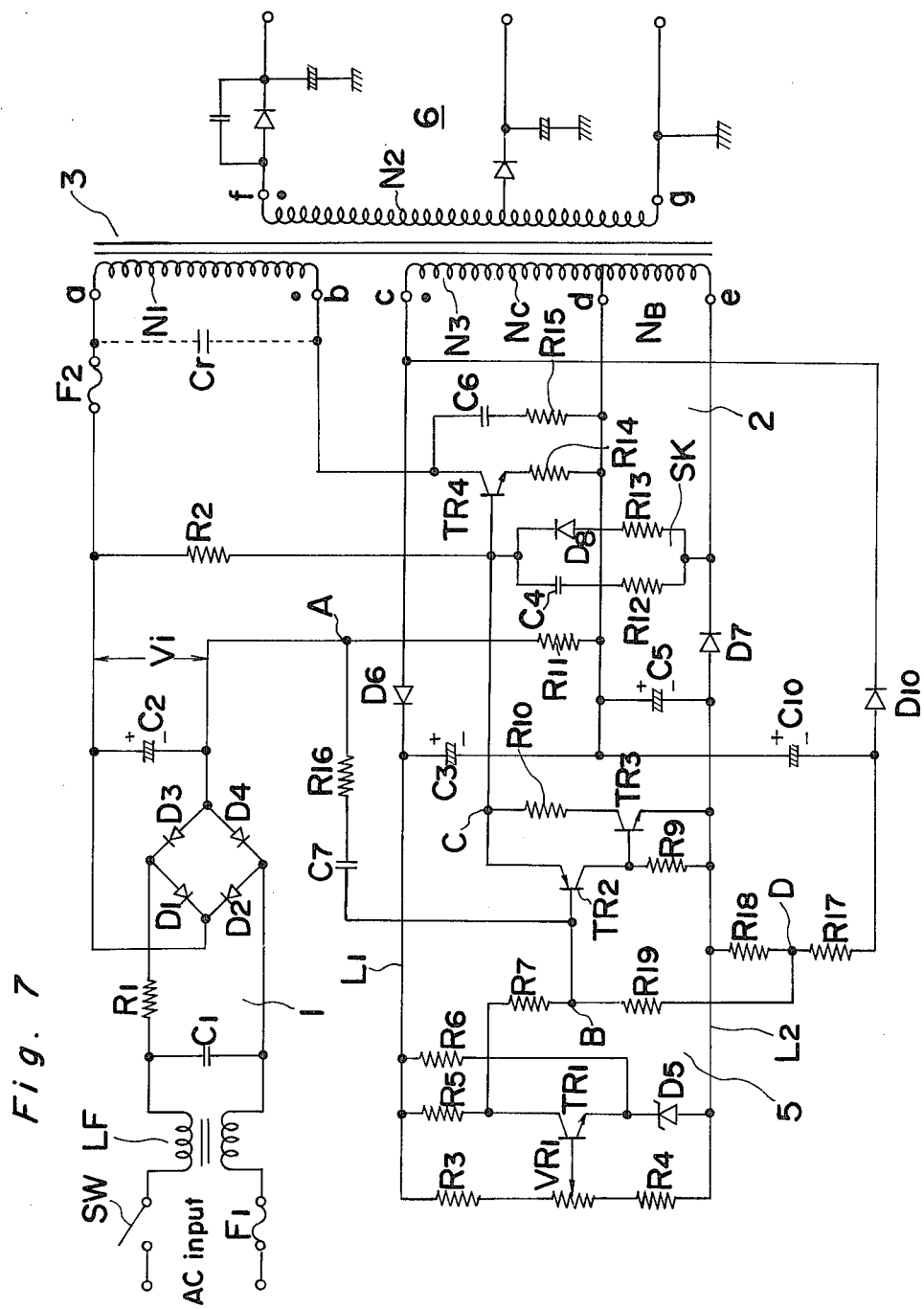
Figure 8:
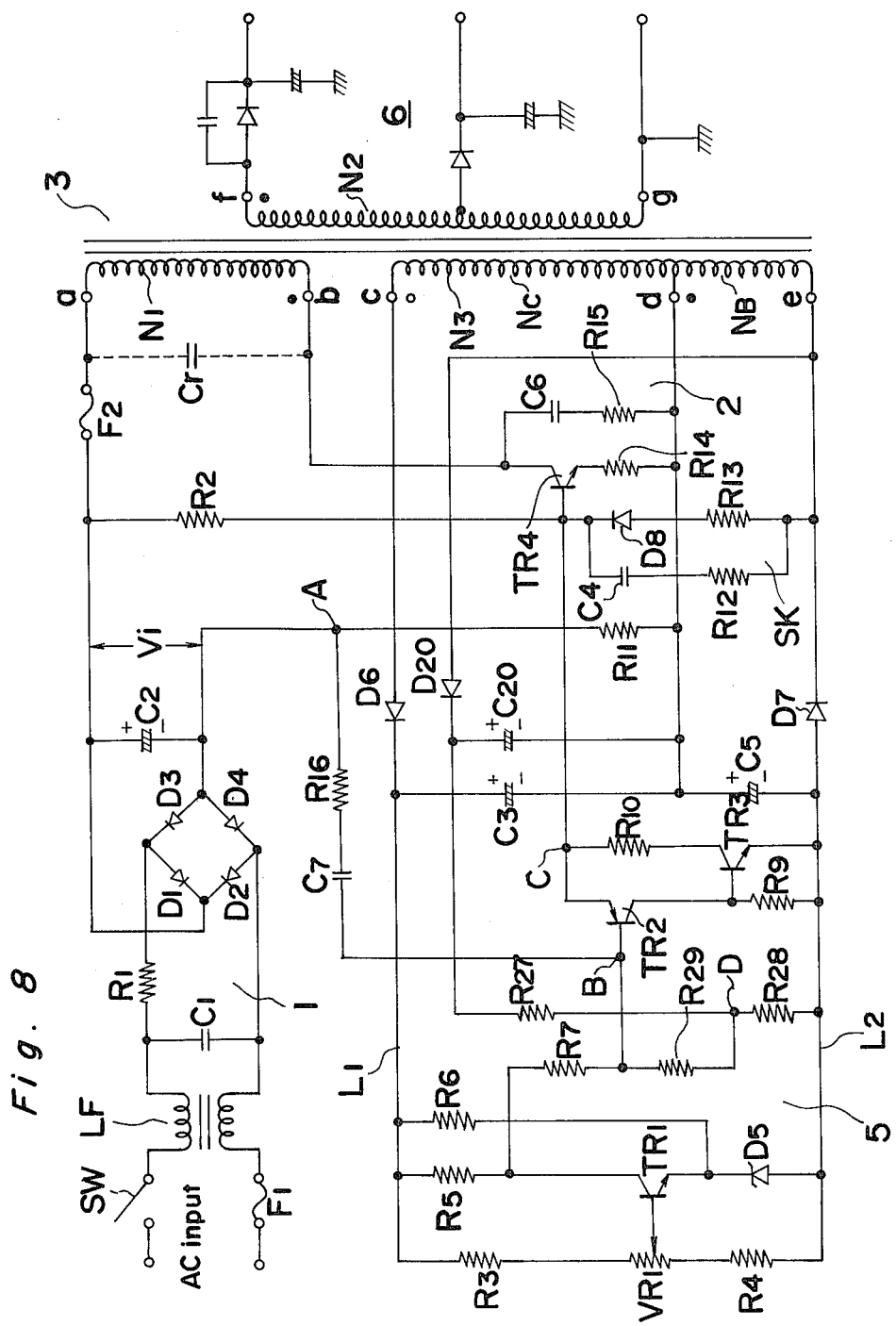
Figure 9:
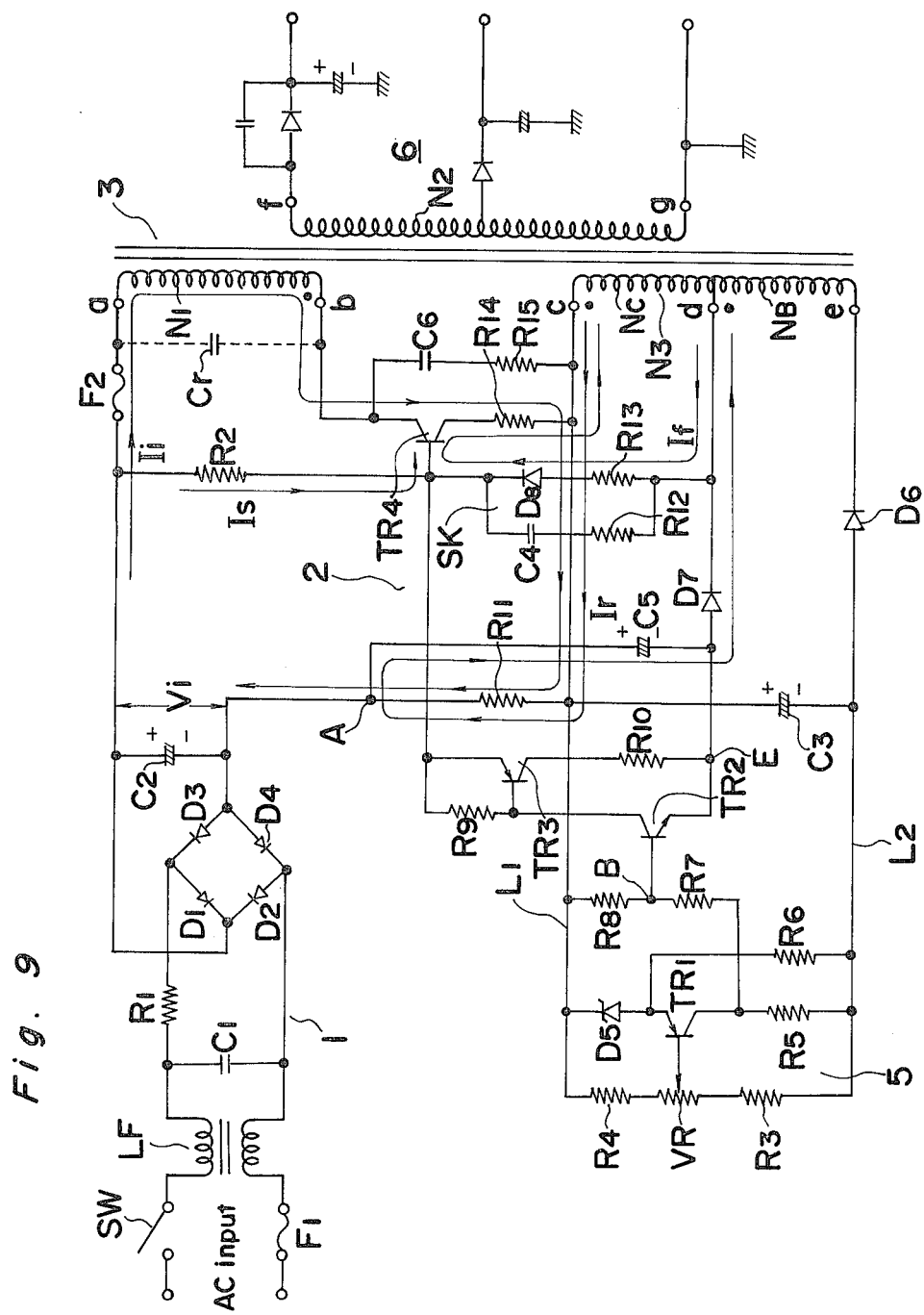
Figure 10:
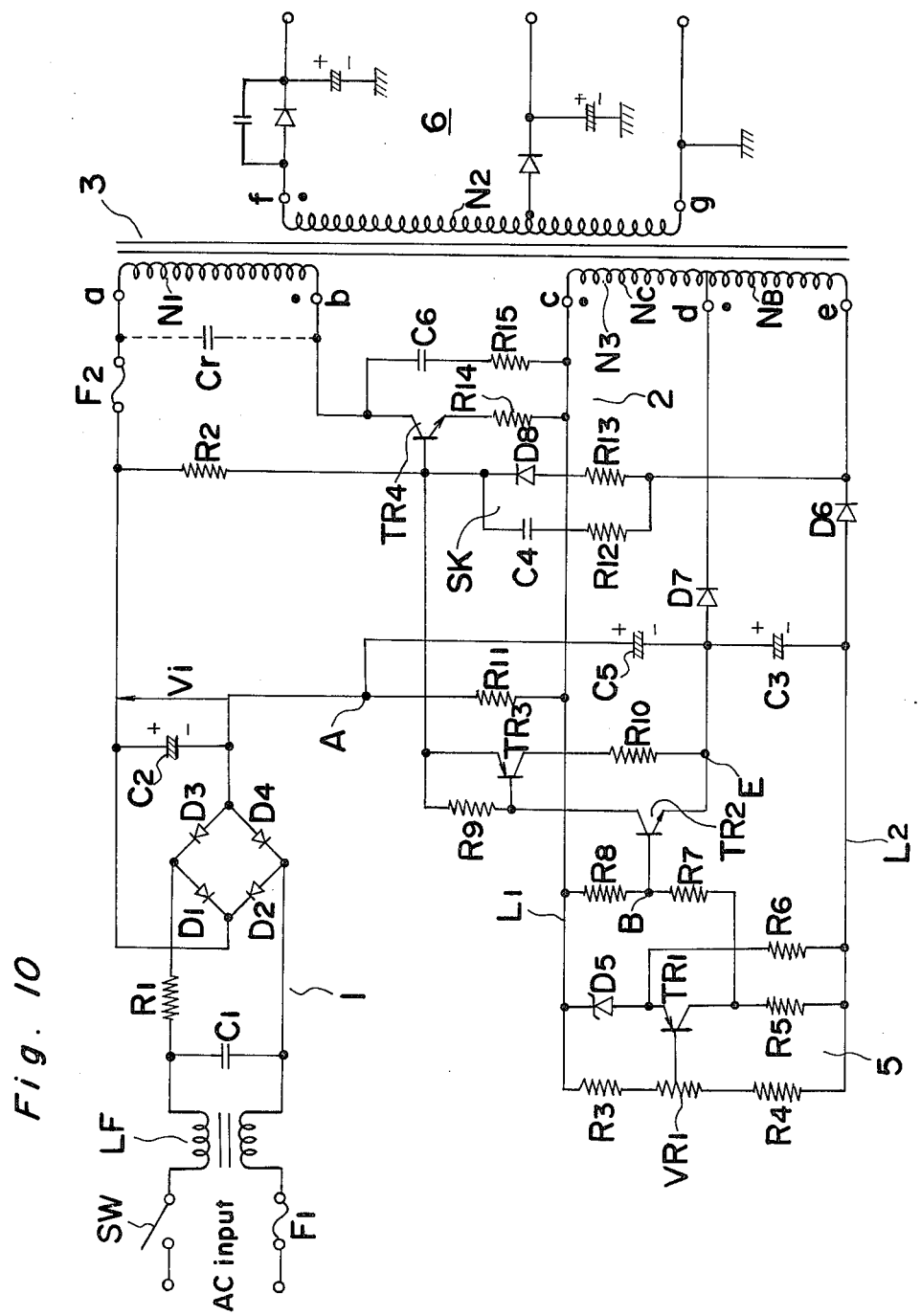
Figure 11:
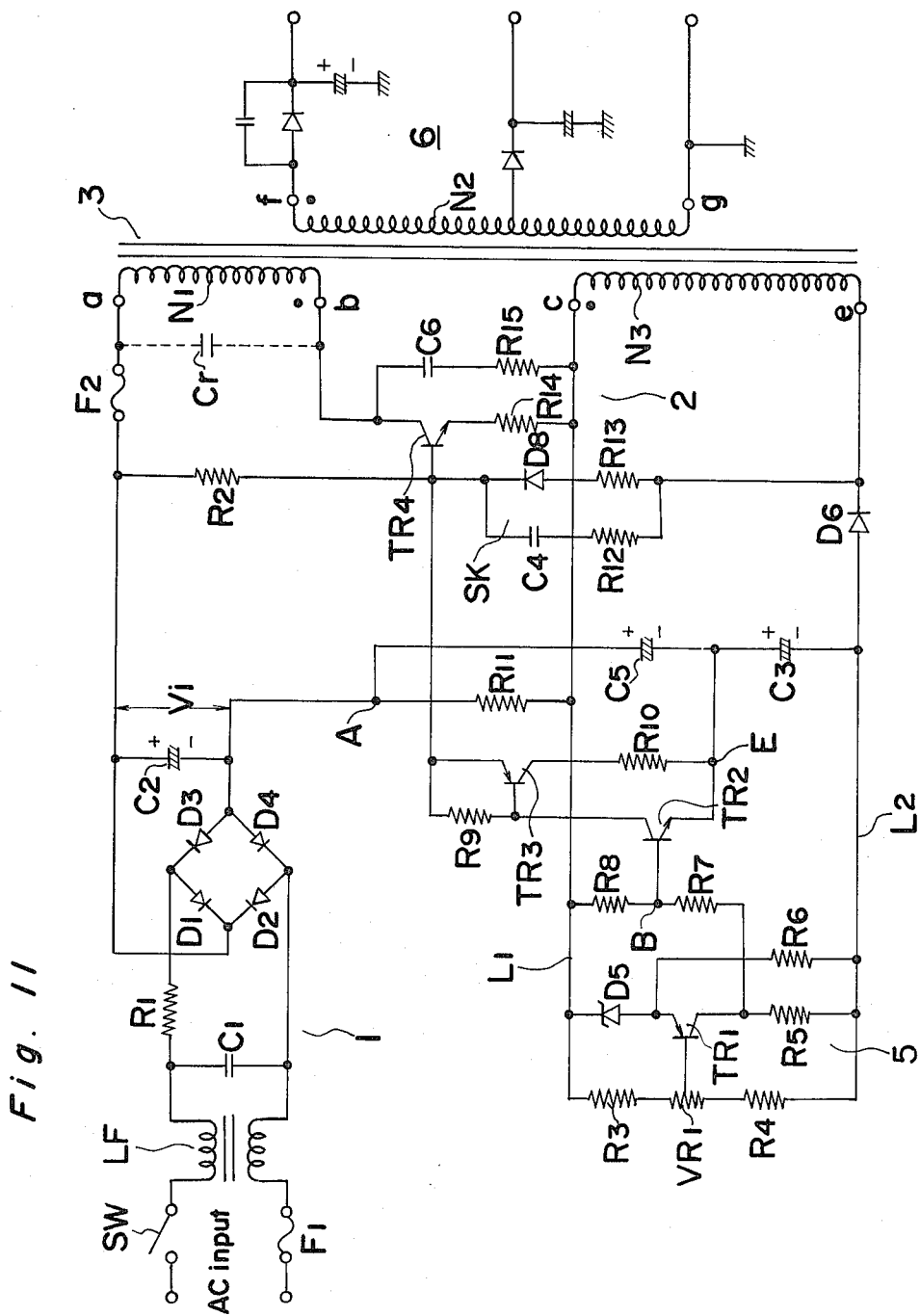
Figure 12:
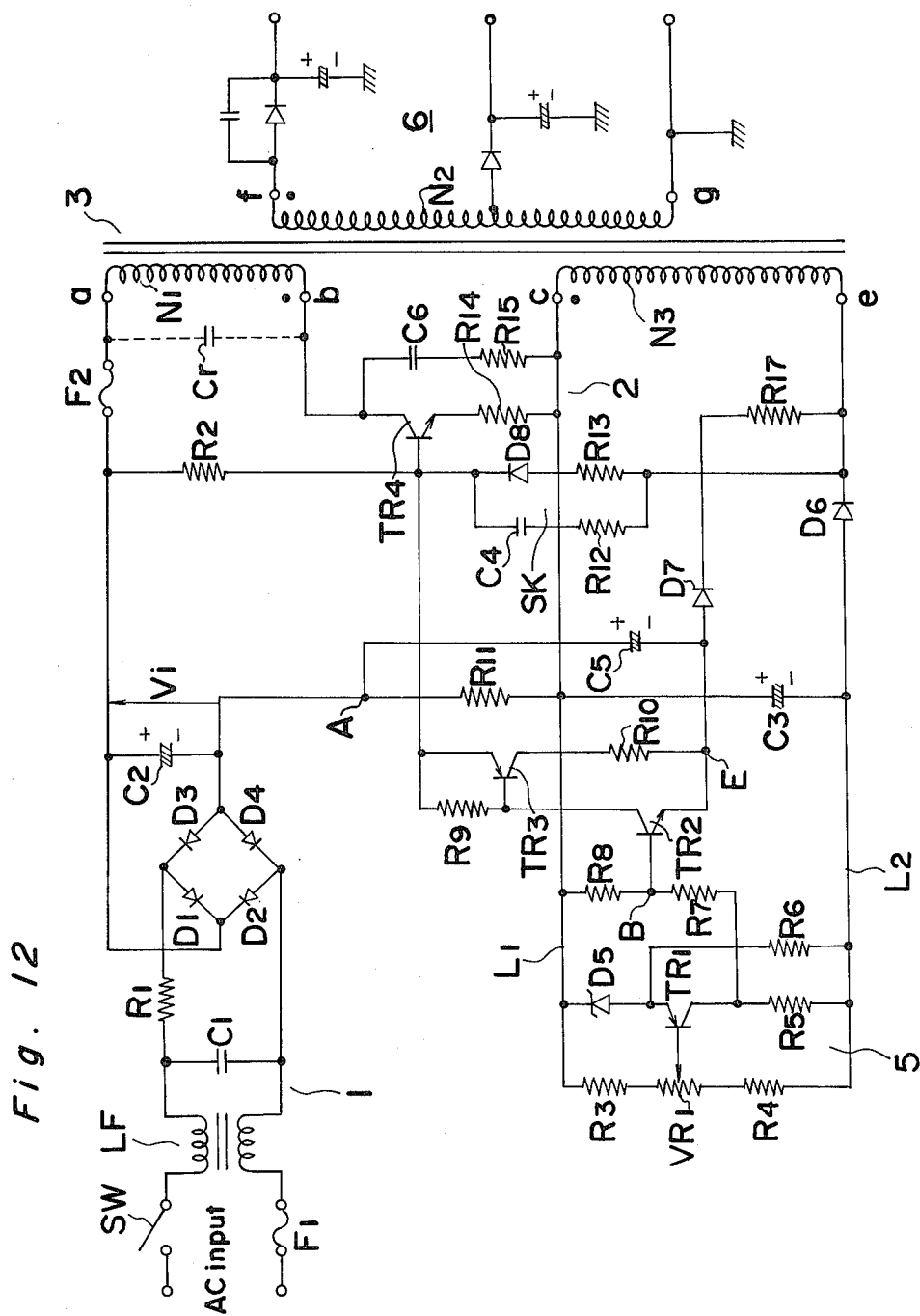

4b and 4c showing the curves according to the present invention;

FIG. 5 is a graph showing waveforms obtained at various points in the circuit of FIG. 3;

FIG. 6 is a circuit diagram of a power supply circuit of switching regulator type according to the second embodiment of the present invention;

FIG. 7 is a circuit diagram of a power supply circuit of switching regulator type according to the third embodiment of the present invention;

FIG. 8 is a circuit diagram of a power supply circuit of switching regulator type according to the fourth embodiment of the present invention;

FIG. 9 is a circuit diagram of a power supply circuit of switching regulator type according to the fifth embodiment of the present invention;

FIG. 10 is a circuit diagram showing a first modification of the fifth embodiment of the present invention;

FIG. 11 is a circuit diagram showing a second modification of the fifth embodiment of the present invention; and FIG. 12 is a circuit diagram showing a third modification of the fifth embodiment of the present invention.

DESCRIPTION OF THE PREFERRED EMBODIMENTS

Referring to FIG. 3, a power supply circuit of switching regulator type according to a first embodiment of the present invention comprises an input rectifying portion 1, blocking oscillator portion 2, converter transformer 3, control circuit portion 5, and output rectifying portion 6.

The input rectifying portion 1 has the same structure as that of the prior art and it comprises a pair of AC input terminals, a main switch SW, a line filter LF defined by a transformer and a capacitor C1, a bridge rectifying circuit defined by diodes D1 to D4, and a capacitor C2. The input rectifying portion 1 receives commercial AC voltage at its AC input terminals and produces DC voltage Vi across the smoothing capacitor C2.

The converter transformer 3 comprises an input winding N1 having terminals a and b at its opposite ends, an output winding N2 having terminals f and g at its opposite ends and another winding N3 having terminals c and e at its opposite ends and a tap d intermediately thereof. The winding N3 is divided into two winding portions: a portion between the terminal c and tap d defining a winding NC; and a portion between the tap d and terminal e defining a winding NB.

The output rectifying circuit 6 is substantially the same as that of the prior art and is defined by a secondary winding N2, and rectifiers each comprising capacitor and diode, as shown.

The blocking oscillator portion 2 comprises a switching transistor TR4 having its collector connected to the terminal b of the input winding N1, its emitter connected through a resistor R14 to a line L1, and its base connected to a resistor R2. The resistor R14 is provided for controlling the feedback current in such a manner as to quickly turn off the switching transistor TR4. The line L1 is connected to the terminal c of the winding NC, and is also connected to a resistor R11 which is further connected through a junction A to the capacitor C2 of the input rectifying circuit 1. Thus, a path is defined from the input winding N1 through the transistor TR4, resistor R14 and resistor R11 to the capacitor C2 of the input rectifying circuit 1. Through this path, an input current Ii flows when the transistor TR4 is on. A capacitor C6 and a resister R15 is connected between the collector of the transistor TR4 and the terminal c of the winding NC for the wave-shaping of the voltage produced across the input winding N1 during the off-period of the transistor TR4.

A capacitor C3 and a diode D6 are connected in series between the line L1 and the terminal e of the winding NB for charging the capacitor C3 during the off-period of the transistor TR4. The voltage charged in the capacitor C3 is proportional to the voltage produced from the output rectifying circuit 6.

The junction A is connected to a capacitor C5, which is in turn connected through a diode D7 to the tap d. Thus, a path is defined from the terminal c through the resistor R11, junction A, capacitor C5 and diode D7 to the tap d. A current Ir flows through this path during the off-period of the transistor TR4 for charging the capacitor C5.

The terminal e is connected to a current control circuit SK, defined by resistors R12 and R13, diode D8 and capacitor C4. The current control circuit SK is further connected to the base of the transistor TR4. Thus, a path is defined from the terminal e through the circuit SK, transistor TR4, resistor R14 to the terminal c for providing a positive feedback current If to the transistor TR4 during the on-period of the transistor TR4.

Figure 1:
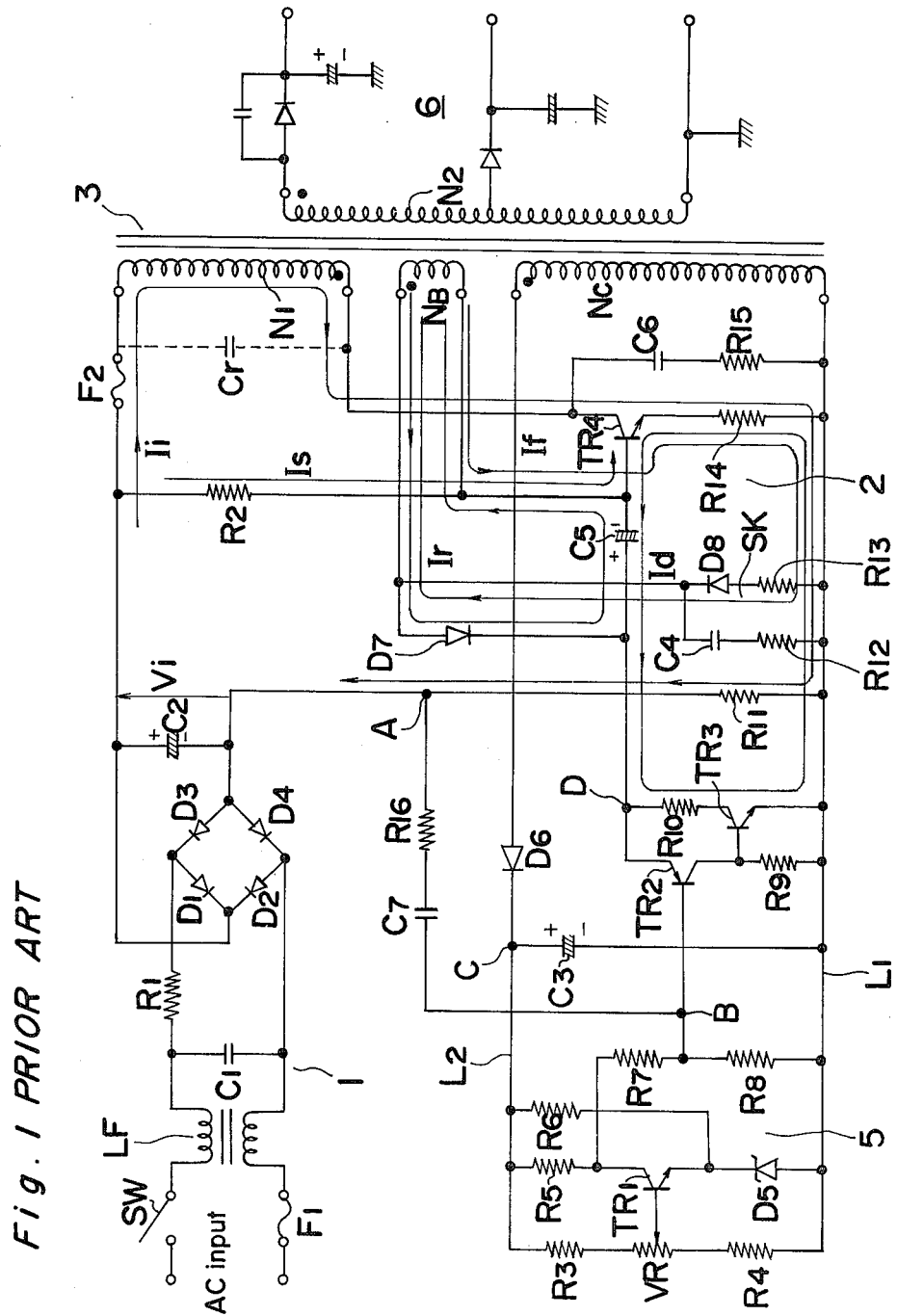
FIG. 1 is a circuit diagram of a power supply circuit of switching regulator type according to the prior art.
Figure 2:
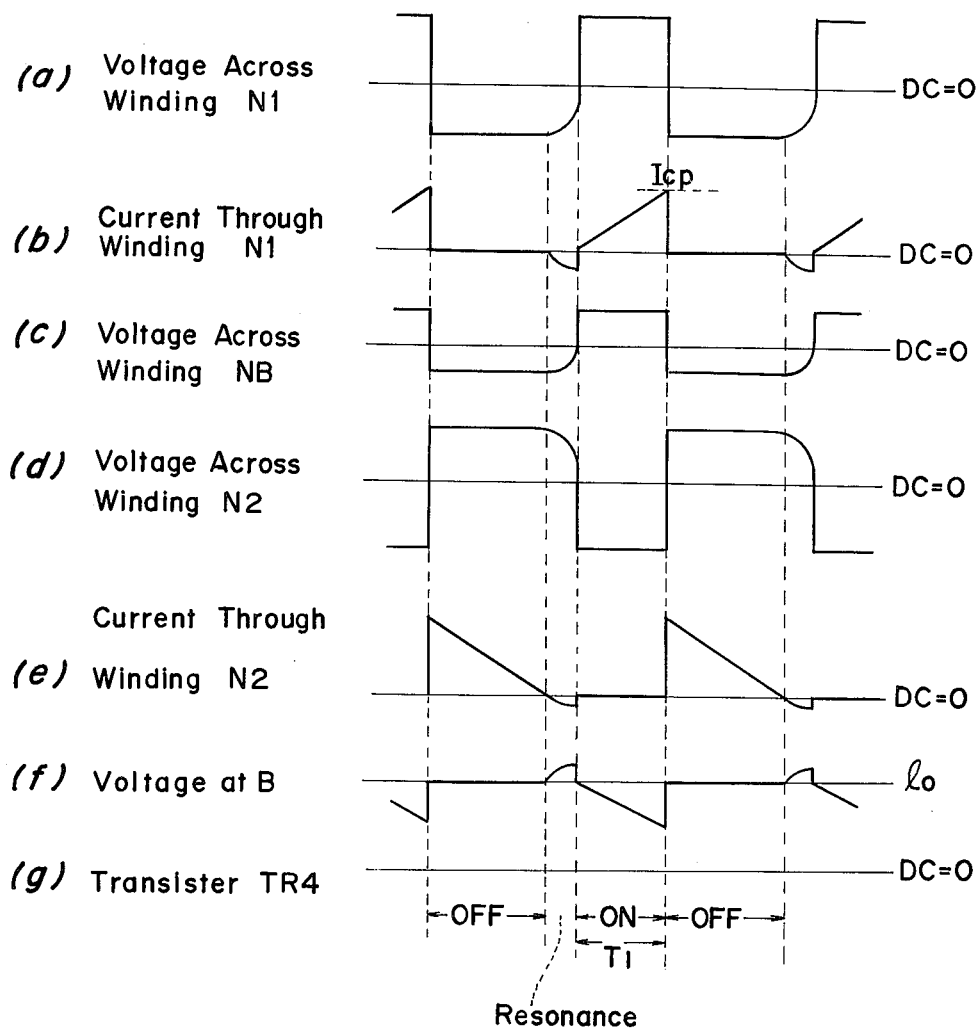
FIG. 2 is a graph showing waveforms obtained at various points in the circuit of FIG. 1.

The base of the transistor TR4 is also connected to an emitter of a switching transistor TR3 and also to a resistor R9. The resistor R9 is further connected to the base of the transistor TR3. The base of the transistor TR3 is connected to a collector of a transistor TR2. As apparent from the drawings, the transistors TR2 and TR3 of the prior art shown in FIG. 1, are PNP type and NPN type, respectively, whistle the transistors TR2 and TR3 of the first embodiment, as well as second embodiment described later, are NPN type and PNP type respectively. The collector of the transistor TR3 is connected to a resistor R10 and further to a junction E. The junction E is connected to the emitter of the transistor TR2 and also to a junction between the capacitor C5 and the diode D7. Thus, a path is defined from the capacitor C5, junction A, resistor R11, resistor R14, between emitter and base of transistor TR4, between emitter and collector of transistor TR3, resistor R10 and junction E to the capacitor C5. Through this path, a discharging current (serving as a reverse biasing current Id) flows from the capacitor C5 to reverse bias the transistor TR4.

The control circuit portion 5 comprises resistor R3, variable resistor VR1 and resistor R4 connected in series between lines L1 and L2. The line L2 is connected to the junction between the capacitor C3 and the diode D6. A series connection of zenor diode D5, transistor TR1 and resistor R5 is also connected between the lines L1 and L2. The base of the transistor TR1 is connected to a tap of the variable resister VR1. The emitter of the transistor TR1 is connected through a resister R6 to the line L2, and the collector thereof is connected through a resistor R7 to a junction B.

The control circuit portion 5 further comprises diode D30 and capacitor C30 connected in series between the tap d and the line L1, defining a path from the tap d through diode D30 and capacitor C30 to the terminal c. Through this path, a current flows during the on-period of the transistor TR4 to charge the capacitor C30. Since the voltage generated across the winding NC during the on-period of the transistor TR4 is proportional to the input voltage Vi, the voltage charged across the capacitor C30 is also proportional to the input voltage Vi. A series connection of resistors R37 and R38 is connected parallelly to the capacitor C30 so as to produce a voltage relative to the charged voltage in the capacitor C30 at a junction D between the resistors R37 and R38. The junction D is connected through a resistor R39 to the junction B.

At the junction B, the voltage from the resistor R7 is added with the voltage from the resistor R39. The added voltage is applied to the base of the transistor TR2.

Next, the operation of the power supply circuit of the first embodiment is described with reference to FIG. 5 showing waveforms of major points in the circuit of FIG. 3.

For the purpose of better understanding, first the operation of the blocking oscillator portion 2 is described in connection with the input rectifying circuit 1 and the converter transformer 3. When the main switch SW is turned on, a DC voltage Vi is produced across the capacitor C2, thereby flowing a starting current Is through the resistor R2 to the base of the switching transistor TR4. Thus, the switching transistor TR4 is turned on to establish a positive voltage at the terminal a of the input winding N1 as shown by a waveform (a) in FIG. 5 and, at the same time, flowing a current Ii from the input rectifying circuit 1 through the input winding N1, transistor TR4, resistor R14, resistor R11, junction A, and back to the input rectifying circuit 1, thereby accumulating energy in the winding N1.

As apparent from the waveform (e) of FIG. 5, the terminal e of the winding N3 has a positive potential with respect to that at the terminal c and, therefore, during the on-period of the transistor TR4, a positive feedback current If flows from terminal e through the positive feedback current control circuit SK, switching transistor TR4, and resistor R14 to the terminal c for maintaining the transistor TR4 on.

As shown by a waveform (b) in FIG. 5, the current Ii flowing through the transistor TR4 gradually increases during the on-period of the switching transistor TR4. Thus, when assuming that the voltage level at the line L1 is a reference voltage level, the voltage level at the junction A gradually decreases and, therefore, the voltage level at the junction E also gradually decreases. It is to be noted that the voltage level at the junction E is below the reference voltage level by an amount equal to the sum of voltage drop across the resistor R11 and that across the capacitor C5, as indicated by a voltage level VE in waveform (h). In the meantime, the transistor TR2 has been receiving voltage from the junction B in a manner described later. When the voltage level at the junction E falls below a level VB indicated in waveform (h), and further below base-emitter voltage VBE determined by the transistor TR2, the transistor TR2 conducts and, therefore, the transistor TR3 conducts. Thus, a reverse biasing current Id flows from the capacitor C5 through the junction A, resistor R11, resistor R14, transistor TR4, transistor TR3, resistor R10 and back to the capacitor C5 to reverse bias the transistor TR4, thereby turning the transistor TR4 off.

When the switching transistor TR4 is turned off, the energy accumulated in the input winding N1 is dissipated by way of current (waveform (g) in FIG. 5) flowing from the secondary winding N2 to a load (not shown). Thus, the voltage generated at the terminal f of the secondary winding, as shown by a waveform (f), is opposite to the voltage at the terminal a.

As shown by a waveform (e), the voltage at the terminal c of the winding N3 is proportional to the output voltage produced across the secondary winding N2. Therefore, a current relative to the output voltage flows from the terminal c through the capacitor C3 and diode D6 to the terminal e, thereby charging the capacitor C3 with a voltage which is proportional to the output voltage.

Furthermore, during the off-period of the transistor TR4, a current Ir flows from the terminal c through resistor R11, junction A, capacitor C5 and diode D7 to the tap d so as to charge the capacitor C5 in the polarity shown in FIG. 3.

The input winding N1 is provided in association with a resonance capacitor Cr, such as in a manner shown by a chain line in FIG. 3, and by such a resonance capacitor Cr, the switching transistor TR4 is biased forwardly, thereby turning the transistor TR4 on again, repeating the above described operation again.

Next, the description is particularly direction to the operation of the control circuit 5.

During the on-period of the transistor TR4, a current flows from the tap d through the diode D30 and capacitor C30 to the terminal c, thereby charging the capacitor C30. During the on-period of the transistor TR4, the voltage Vdc across the winding NC is proportional to the input voltage Vi such that:

$$Vdc = Vi \times f(NC)/f(N1) \times K$$

wherein f(NC) is the number of windings on the winding NC, f(N1) is the number of windings on the winding N1, and K is a constant. Thus, the voltage charged in the capacitor C30 is proportional to the input voltage Vi. The voltage charged across the capacitor C30 is suitably regulated by the resistors R37, R38 and R39, and is fed to the junction B. Thus, the voltage fed to the junction B from the resistor R39 is proportional to the input voltage such that when the input voltage Vi is high, the voltage fed to the junction B also is high, and vice versa.

Also fed to the junction B is a voltage from the resistor R7 which is proportional to the output voltage produced across the secondary winding N2, as understood from the description given below.

Since the capacitor C3 is charged, during the off-period of the transistor TR4, with a voltage relative to the voltage produced across the secondary winding N2, the voltage on the line L1 is also proportional to the output voltage. Since the capacitor C3 is charged with a voltage proportional to the voltage generated across the secondary winding N2 during off-period of the transistor TR4, the voltage across the capacitor C3 is substantially proportional to the output voltage. Therefore, when assuming that the voltage level on the line L1 as a reference voltage level, the voltage level at the base of the transistor TR1 drops when the output voltage increases. But, in the meantime, the voltage level at the emitter of the transistor TR1 is maintained constant by the zenor diode D5. Thus, the conductivity of the transistor TR1 increases, resulting in increase of voltage level at the collector of the transistor TR1. Thus, voltage fed to the junction B through the resistor R7 increases.

In summary, the voltage level at the junction B is dependent both to the input voltage as obtained during on-period of the transistor TR4, and output voltage as obtained during off-period of the transistor TR4, such that: when the input and/or output voltage increases, the voltage level at the junction B increases; and when the input and/or output voltage decreases, the voltage level at the junction B decreases.

When the voltage level VB at the junction B increases as happened when the output voltage is increased, off-period of the transistor TR2 becomes short, because the voltage level at the junction E, which is gradually decreasing, falls below the voltage level VB at the junction B and reaches the required voltage level to turn the transistor TR2 on in a short period of time. When the transistor TR2 turns on, the reverse bias current Id flows through the transistor TR4, thereby turning off the transistor TR4 and making the on-period of the transistor TR4 short. Therefore, in the case where the output voltage increases above a required level, the on-period of the transistor TR4 becomes short to reduce the output voltage.

Figure 4A:
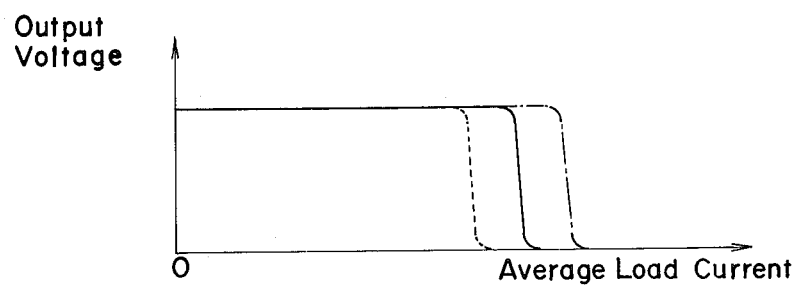
FIGS. 4a, 4b and 4c are graphs each showing output current to output voltage characteristic curve, FIG. 4a showing the curve according to the prior art and FIGS.
Figure 4B:
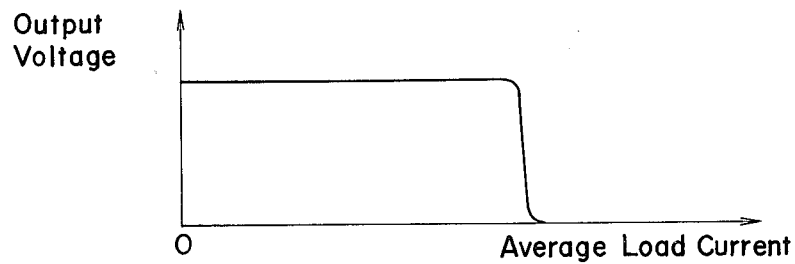

Furthermore, according to the power supply circuit of the first embodiment, the voltage level VB at the junction B also becomes high when the input voltage Vi is high, thereby shortening the off-period of the transistor TR2. This is true also when the maximum available current flows through the load connected to the output rectifying circuit 6. In the case where the maximum available load current flows through the load, the transistor TR1 turns off, whereby the level of the voltage fed to the terminal B from the resistor R7 becomes lowest. In this case, by suitably selecting the resistors R5, R7, R39, R37 and R38, it is possible to change the turn-off time of the switching transistor TR4 so as to maintain the maximum available load current constant regardless of change of the input voltage Vi, as shown by output current to output voltage characteristic curve in FIG. 4b. Therefore, the power supply circuit of the present invention has a high stability of output current regardless of undesirable fluctuation in the input voltage.

Furthermore, according to the first embodiment, since the voltage to be applied between the base and emitter of the transistor TR2 during the off-period of the transistor TR4 is a voltage between VB and VE shown in waveform (h) in FIG. 5, the transistor TR2 can be of a type having a relatively low dielectric strength, which is relatively a low cost transistor. Thus, it is possible to reduce the manufacturing cost.

In addition, according to the first embodiment, since the winding NB and the winding NC are provided in a single winding N3, there is no need to provide an electric insulation between the windings NC and NB, thereby providing the converter transformer in a compact size, and simplifying the structure.

Moreover, according to the first embodiment, it is not necessary to provide DC cutting capacitor and current regulating resistor, such as C7 and R16 shown in FIG. 1, the structure can be simplified.

Referring to FIG. 6, there is shown a power supply circuit of switching regulator type according to the second embodiment of the present invention. When compared with the power supply circuit of FIG. 3 described above, the circuit of FIG. 6 has an improved current control circuit SK'. More specifically, in place of the resistor R13, zenor diode 40, transistor TR40 and resistors R40, R41 and R42 are provided to define a constant current source. The constant current source operates in the following manner.

The transistor TR40 is connected to the resistor R42 and zenor diode D40, and is so biased by the voltage generated across the winding N3 as to be turned on during the on-period of the switching transistor TR4. Therefore, during the on-period of the transistor TR4, the positive feedback current If flows mostly through the collector-emitter of the transistor TR40, and partly through the resistor R41. Only few current flows through the resistor R12, because the resistance of the resistor R12, which is about 1-3 kilohms, is much greater than the resistance of the resistor R40, which is about several 10s ohms.

Assuming that the anode of the diode D8 as a reference voltage level, the emitter voltage of the transistor TR40 can be given as follows:

$$V_z - V_{be}$$

wherein Vz is a zenor voltage of the zenor diode D40, and Vbe is a base-emitter voltage of the transistor TR40. Therefore, a current flowing through the resistor R40 can be given as follows:

$$(V_z - V_{be})/R40$$

wherein R40 is the resistance of the resistor R40. Since each of the values Vz, Vbe and R40 is constant, the current flowing through the resistor R40 is maintained constant. Therefore, the positive feedback current If fed to the base of the transistor TR4 can be maintained substantially constant regardless of variation in the input voltage Vi, i.e., in the voltage across the winding N3.

In the current control circuit SK' shown in FIG. 6, the resistor R41 is provided for reducing the power consumed in the transistor TR40 and, therefore, it is not an inevitable element; thus, it can be deleted. The diode D8 is provided for preventing the start current Is from being fed to the winding NB. Furthermore, the resistor R12 and capacitor C4 are provided to maintain the transistor TR4 in off-state by providing reverse bias voltage produced across the winding N3 to the transistor TR4 between base and emitter thereof.

According to the second embodiment described above in connection with FIG. 6, since the positive feedback current applied to the base of the transistor TR4 during on-period of the transistor TR4 is substantially maintained constant, it is possible to overcome the undesirable over-drive or under-drive operation of the switching transistor TR4. Therefore, it is possible to widen the range in which the transistor TR4 (thus the power supply circuit itself) operates in a stable condition with respect to the fluctuation of the input voltage. Furthermore, even when the input voltage jumps up very high, such as occurring when the main switch is turned on or when over loading takes place, the collector current of the switching transistor TR4 can be regulated within its maximum available rated amount. Thus, the transistor TR4 can be protected from being damaged by such a high voltage.

Referring to FIG. 7, there is shown a power supply circuit according to the third embodiment of the present invention. As shown in FIG. 7, the third embodiment also has a winding N3, in which the windings NB and NC are defined. When compared with the power supply circuit of the first embodiment shown in FIG. 3, a main difference is in the control circuit portion 5 such that a negative voltage is added to the junction B from the winding NC. More particularly, a capacitor C10 and a diode D10 are connected in series between terminals c and d of the winding NC so that during the on-period of the transistor TR4, a voltage proportional to the input voltage Vi is charged across the capacitor C10 in the polarity shown. When viewed from the line L2, a voltage level at negative-charged side of the capacitor C10 is equal to a voltage difference between the voltage charged across the capacitor C5 and that across the capacitor C10, and the voltage level at the negative-charged side of the capacitor C10, when viewed from the line L2, is negative. This negative voltage is suitably divided by resistors R17 and R18, and in turn is fed from the junction D to the junction B through a resistor R19.

Therefore, according to the third embodiment, the voltage added to the junction B from the junction D becomes high when the input voltage Vi becomes low, and low when the input voltage Vi becomes high.

Furthermore, according to the third embodiment, a gradual decreasing voltage, representing the current Ii flowing through the transistor TR4, is added from the junction A to the junction B in the same manner as in the prior art.

Moreover, according to the third embodiment, the junction B further receives voltage representing the output voltage from the transistor TR1 in the same manner as in the prior art.

The switching transistors TR2 and TR3 of the third embodiment, as well as fourth embodiment described later, are PNP type and NPN type, respectively.

Therefore, the transistor TR2 is controlled such that its turn-on time becomes early when the input voltage Vi is high, and delays when the input voltage Vi is low. Thus, the transistor TR2 operates substantially the same as that in the first embodiment so as to maintain the maximum available load current constant regardless of change of the input voltage Vi, as shown by output current to output voltage characteristic curve in FIG. 4b. Therefore, the power supply circuit of the third embodiment has a high stability of output current regardless of undesirable fluctuation in the input voltage.

Referring to FIG. 8, there is shown a power supply circuit according to the fourth embodiment of the present invention. As shown in FIG. 8, the fourth embodiment also has a winding N3, in which the windings NB and NC are defined. When compared with the power supply circuit of the third embodiment described above in connection with FIG. 7, a main difference is in the control circuit portion 5 such that a voltage relative to the input voltage Vi is added to the junction B from the winding NB in opposite relation to that described in the foregoing embodiments. More particularly, a diode D20 and a capacitor C20 are connected in series between terminals e and d of the winding NB so that during the on-period of the transistor TR4, a voltage proportional to the input voltage Vi is charged across the capacitor C20 in the polarity shown. When viewed from the line L2, a voltage level at positive-charged side of the capacitor C20 is equal to a sum of the voltage charged across the capacitor C5 and that across the capacitor C20, and the voltage level at the positive-charged side of the capacitor C20, when viewed from the line L2, is positive. This positive voltage is suitably divided by resistors R27 and R28, and in turn is fed from the junction D to the junction B through a resistor R29.

According to the fourth embodiment, the voltage added to the junction B from the junction D becomes low when the input voltage Vi is low, and high when the input voltage Vi is high.

Therefore, the transistor TR2 is controls such that its turn-on time delays when the input voltage Vi increases, and becomes early when the input voltage decreases.

Figure 4C:
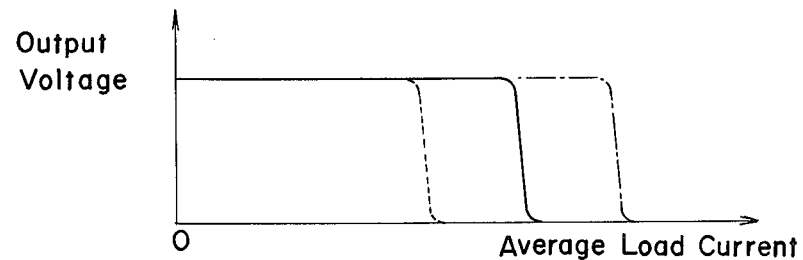

Therefore, according to the fourth embodiment, since the voltage level at the junction B increases by an amount corresponding to the voltage charged in the capacitor C20 when the input voltage Vi increases, the time when the transistor TR4 turns off delays when compared with that of the previous embodiments. Therefore, the maximum available load current becomes very high when the input voltage Vi is high, and very low when the input voltage Vi is low, as shown in graph of FIG. 4c. Thus, the power supply circuit of the fourth embodiment is particularly suitable for use in a device which requires a high load current relative to a low input power.

It is to be noted that the power supply circuit of the first embodiment can be simplified as illustrated in FIG. 9, showing a fifth embodiment of the present invention, such that diode D30 capacitor C30 and resistors R37, R38 and R39 can be eliminated.

Referring to FIG. 10, the power supply circuit of the fifth embodiment shown in FIG. 9 can be modified such that the positive feedback current control circuit SK is connected to the terminal e, instead of tap d, and that the capacitor C3 is connected between the junction E and cathode side of the diode D6. By this arrangement, the capacitor C3 receives a voltage which lower than the previous embodiments and, therefore, the dielectric strength of the capacitor C3 can be weakened, resulting in low cost of the capacitor C3.

Referring to FIG. 11, the power supply circuit shown in FIG. 10 can be modified such that the diode D7 can be eliminated, thereby simplifying the circuit.

Referring to FIG. 12, the power supply circuit shown in FIG. 10 can be modified such that the anode side of the diode D7, which has been described as connected to the tap d, is connected to the terminal e. By this arrangement, since the capacitors C5 and C3 are electrically independent from each other, the capacitor C5 can be selected as having a large capacitance to cope with a large output power, whereas the capacitor C3 can be selected as having a small capacitance to quickly respond to the variation in the output voltage.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. A power supply circuit of switching regulator type comprising:

a converter transformer (3) defined by a first winding (N1) for receiving input power from a DC source (1) and second winding (N2) for producing output power;

a switching transistor means (TR4) connected to said first winding (N1) for alternately making and breaking electric connection between said DC source and said first winding by alternate turn on and off operations of said switching transistor means (TR4);

a rectifier (6) connected to said second winding for rectifying the output power;

first detecting means (C3, D6, N3) for detecting the rectified output DC voltage during off-period of said switching transistor means (TR4) and for producing an output-voltage signal representing said output DC voltage;

second detecting means (C30, D30, R37, R38, R39, N3; C10, D10, R17, R18, R19, N3; C20, D20, R27, R28, R29, N3) for detecting the input DC voltage during on-period of said switching transistor means and for producing an input-voltage signal representing said input DC voltage;

adding means (B) for adding said input-voltage signal and output-voltage signal and for producing a sum signal representing the sum of input- and output-voltage signals;

means (TR2, TR3, R9, R10, R14, C5) for controlling said on and off operations of said switching transistor means based on said sum signal so as to stabilize the rectified output power.

2. A power supply circuit as claimed in claim 1, wherein said first detecting means (C3, D6, N3) comprises a third winding (N3) provided in said converter transformer, and a first capacitor (C3) connected to said third winding, said first capacitor (C3) being charged with a voltage indicative of said rectified output voltage, during off-period of said switching transistor means.

3. A power supply circuit as claimed in claim 1, wherein said second detecting means (C30, D30, R37, R38, R39, N3; C10, D10, R17, R18, R19, N3; C20, D20, R27, R28, R29, N3) comprises said third winding (N3), and a second capacitor (C30; C10; C20) connected to said third winding, said second capacitor being charged with a voltage indicative of said input voltage, during on-period of said switching transistor means.

4. A power supply circuit as claimed in claim 1, wherein said controlling means (TR2, TR3, R9, R10, R14, C5) comprises a third capacitor (C5) being charged during off-period of said switching transistor means, and a switching means (TR2, TR3, R9, R10) connected to said third capacitor and said switching transistor means (TR4), whereby when said switching means closes during on-period of said switching transistor means, a discharging current flows from said third capacitor (C5) through said switching transistor means in a reverse bias direction, resulting in turning off of said switching transistor means (TR4).

5. A power supply circuit as claimed in claim 1:
wherein said first detecting means (C3, D6, N3) comprises a third winding (N3) provided in said converter transformer, and a first capacitor (C3) connected to said third winding, said first capacitor (C3) being charged with a voltage indicative of said rectified output voltage, during off-period of said switching transistor means;

wherein said second detecting means (C30, D30, R37, R38, R39, N3; C10, D10, R17, R18, R19, N3; C20, D20, R27, R28, R29, N3) comprises said third winding (N3), and a second capacitor (C30; C10; C20) connected to said third winding, said second capacitor being charged with a voltage indicative of said input voltage, during on-period of said switching transistor means;

wherein said switching transistor means (TR4) comprises a switching transistor (TR4) having its emitter and collector defining a current path between said DC source and said first winding (N1); and wherein said controlling means (TR2, TR3, R9, R10, R14, C5) comprises current detecting means (R11; R11, C7, R16) for detecting a current flowing through said input winding and the collector-emitter of said switching transistor (TR4) and for producing an input-current signal indicative of the detected current, a third capacitor (C5) being charged during off-period of said switching transistor, and a switching means (TR2, TR3, R9, R10) connected between base and emitter of said switching transistor (TR4) through said third capacitor (C5), whereby during on-period of said switching transistor (TR4) and when said input-current signal exceeds, or falls below, a predetermined level, said switching means closes so as to flow a discharging current from said third capacitor (C5) through said switching transistor in a reverse bias direction, resulting in turning off of said switching transistor (TR4).

6. A power supply circuit as claimed in claim 5, wherein said switching means (TR2, TR3, R9, R10) closes early as the input-voltage signal increases above a predetermined level, and also as the output-voltage signal increases above a predetermined level, and closes late as the input-voltage signal decreases below a predetermined level, and also as the output-voltage signal decreases below a predetermined level.

7. A power supply circuit as claimed in claim 5, wherein said switching means (TR2, TR3, R9, R10) comprises at least one transistor (TR2) having base, emitter and collector, said emitter and collector of said transistor (TR2) defining a path for flowing said discharging current.

8. A power supply circuit as claimed in claim 7, wherein said input-voltage signal is applied to said base of said transistor (TR2).

9. A power supply circuit as claimed in claim 7, wherein said output-voltage signal is applied to said base of said transistor (TR2).

10. A power supply circuit as claimed in claim 7, wherein said input-current signal is applied to a base of said switching transistor (TR2).

11. A power supply circuit as claimed in claim 7, wherein said input-current signal is applied to an emitter of said switching transistor (TR2).

12. A power supply circuit as claimed in claim 5, wherein said switching means (TR2, TR3, R9, R10) closes early as the input-voltage signal decreases below a predetermined level, and also as the output-voltage signal increases above a predetermined level, and closes late as the input-voltage signal increases above a predetermined level, and also as the output-voltage signal decreases below a predetermined level.

13. A power supply circuit as claimed in claim 5, further comprising means (D40, R40, R41, R42, TR40, D8) connected to said base of said switching transistor (TR4) for making a positive feedback current to be supplied to said base of said switching transistor TR4 during on-period of said switching transistor (TR4) constant.

* * * * *